US008547203B2

(12) United States Patent
Sriharto et al.

(10) Patent No.: US 8,547,203 B2
(45) Date of Patent: Oct. 1, 2013

(54) DYNAMIC CONTROL CONTAINMENT UNIT

(75) Inventors: Timur Sriharto, Monroeville, PA (US); Muhammad Rahim, Monroeville, PA (US); Pribadi Kardono, Monroeville, PA (US); Suneil Mandava, Pittsburgh, PA (US); Khang Le, Pittsburgh, PA (US)

(73) Assignee: Mobile Aspects, Pittsburgh, PA (US)

( * ) Notice: Subject to any disclaimer, the term of this patent is extended or adjusted under 35 U.S.C. 154(b) by 108 days.

(21) Appl. No.: 13/158,827

(22) Filed: Jun. 13, 2011

(65) Prior Publication Data
US 2011/0285536 A1 Nov. 24, 2011

Related U.S. Application Data

(63) Continuation of application No. 12/240,022, filed on Sep. 29, 2008, which is a continuation of application No. 10/209,348, filed on Jul. 31, 2002, now abandoned.

(60) Provisional application No. 60/344,920, filed on Dec. 21, 2001.

(51) Int. Cl.
*G08B 13/14* (2006.01)
(52) U.S. Cl.
USPC ........ 340/5.7; 340/5.73; 340/10.1; 340/568.1
(58) Field of Classification Search
USPC .................... 340/5.7, 5.73, 10.42, 8.1, 572.7, 340/568.1, 5.9, 5.91, 10.1; 235/383
See application file for complete search history.

(56) References Cited

U.S. PATENT DOCUMENTS

| | | | |
|---|---|---|---|
| 3,958,102 A | 5/1976 | Burt | |
| 4,116,512 A | 9/1978 | Wiser | |
| 4,118,693 A * | 10/1978 | Novikoff | ..................... 340/572.7 |
| 4,227,037 A | 10/1980 | Layton | |
| 4,496,406 A | 1/1985 | Dedow | |
| 4,636,950 A | 1/1987 | Caswell et al. | |
| 4,673,932 A | 6/1987 | Ekchian et al. | |
| 4,847,764 A | 7/1989 | Halvorson | |
| 4,860,918 A | 8/1989 | Wuyten et al. | |
| 5,029,183 A | 7/1991 | Tymes | |
| 5,287,414 A | 2/1994 | Foster | |
| 5,295,154 A | 3/1994 | Meier et al. | |
| 5,389,919 A | 2/1995 | Warren et al. | |
| 5,410,315 A * | 4/1995 | Huber | ......................... 340/10.32 |
| 5,431,299 A | 7/1995 | Brewer et al. | |
| 5,495,961 A | 3/1996 | Maestre | |
| 5,565,858 A | 10/1996 | Guthrie | |

(Continued)

FOREIGN PATENT DOCUMENTS

| | | |
|---|---|---|
| JP | 2001052054 A | 2/2001 |
| JP | 2002282200 A | 10/2002 |

*Primary Examiner* — Edwin Holloway, III
(74) *Attorney, Agent, or Firm* — The Webb Law Firm

(57) ABSTRACT

The present invention is a dynamic control containment unit for holding a plurality of discrete items, including a signal emitting mechanism associated with each of the plurality of discrete items, an enclosed housing having at least one receptacle accessible by a user and having at least one of the plurality of items contained therein, a passive signal receiving mechanism in communication with the receptacle for receiving signals emanating from the signal emitting mechanism and a securement system configured to prevent unauthorized access to the dynamic control containment unit. A controller is in communication with the signal receiving mechanism and initiates actions based upon the signal content.

19 Claims, 7 Drawing Sheets

(56) References Cited

U.S. PATENT DOCUMENTS

| | | | |
|---|---|---|---|
| 5,689,238 | A | 11/1997 | Cannon, Jr. et al. |
| 5,713,485 | A | 2/1998 | Liff et al. |
| 5,729,697 | A | 3/1998 | Schkolnick et al. |
| 5,739,765 | A | 4/1998 | Stanfield et al. |
| 5,751,220 | A | 5/1998 | Ghaffari |
| 5,751,221 | A | 5/1998 | Stanfield et al. |
| 5,765,707 | A | 6/1998 | Kenevan |
| 5,771,003 | A | 6/1998 | Seymour |
| 5,774,053 | A | 6/1998 | Porter |
| 5,774,059 | A | 6/1998 | Henry et al. |
| 5,797,515 | A | 8/1998 | Liff et al. |
| 5,801,628 | A * | 9/1998 | Maloney .................. 340/568.2 |
| 5,804,810 | A | 9/1998 | Woolley et al. |
| 5,857,152 | A * | 1/1999 | Everett .......................... 455/406 |
| 5,912,818 | A | 6/1999 | McGrady et al. |
| 5,917,433 | A | 6/1999 | Keillor et al. |
| 5,936,527 | A | 8/1999 | Isaacman et al. |
| 5,950,630 | A | 9/1999 | Portwood et al. |
| 5,993,046 | A | 11/1999 | McGrady et al. |
| 6,075,441 | A | 6/2000 | Maloney |
| 6,112,502 | A * | 9/2000 | Frederick et al. ................ 53/411 |
| 6,116,461 | A | 9/2000 | Broadfield et al. |
| 6,127,928 | A | 10/2000 | Issacman et al. |
| 6,204,764 | B1 | 3/2001 | Maloney |
| 6,296,148 | B1 | 10/2001 | Myers et al. |
| 6,323,782 | B1 | 11/2001 | Stephens et al. |
| 6,392,544 | B1 | 5/2002 | Collins |
| 6,407,665 | B2 * | 6/2002 | Maloney .................... 340/568.1 |
| 6,424,262 | B2 | 7/2002 | Garber et al. |
| 6,445,297 | B1 | 9/2002 | Nicholson |
| 6,512,459 | B2 | 1/2003 | Benezech et al. |
| 6,512,478 | B1 | 1/2003 | Chien |
| 6,677,857 | B2 | 1/2004 | Bara et al. |
| 6,703,935 | B1 | 3/2004 | Chung et al. |
| 6,707,381 | B1 | 3/2004 | Maloney |
| 6,714,121 | B1 | 3/2004 | Moore |
| 6,745,027 | B2 | 6/2004 | Twitchell, Jr. |
| 6,747,558 | B1 | 6/2004 | Thorne et al. |
| 6,750,771 | B1 | 6/2004 | Brand |
| 6,762,676 | B2 | 7/2004 | Teowee et al. |
| 6,826,514 | B1 | 11/2004 | Antico et al. |
| 6,870,464 | B2 | 3/2005 | Okamura |
| 7,233,620 | B2 | 6/2007 | Brommer |
| 2001/0002448 | A1 * | 5/2001 | Wilson et al. .................. 700/233 |
| 2001/0028308 | A1 | 10/2001 | De La Huerga |
| 2001/0034613 | A1 | 10/2001 | Rubsamen |
| 2001/0044731 | A1 | 11/2001 | Coffman et al. |
| 2002/0027507 | A1 | 3/2002 | Yarin et al. |
| 2002/0038167 | A1 | 3/2002 | Chirnomas |
| 2002/0063622 | A1 | 5/2002 | Armstrong et al. |
| 2002/0113082 | A1 | 8/2002 | Leatherman et al. |
| 2002/0143320 | A1 | 10/2002 | Levin |
| 2002/0145520 | A1 | 10/2002 | Maloney |
| 2002/0153411 | A1 | 10/2002 | Wan et al. |
| 2002/0183882 | A1 * | 12/2002 | Dearing et al. ................ 700/115 |
| 2002/0190871 | A1 | 12/2002 | Stanfield et al. |
| 2003/0030539 | A1 | 2/2003 | McGarry et al. |
| 2003/0034390 | A1 * | 2/2003 | Linton et al. .................. 235/382 |
| 2004/0069850 | A1 * | 4/2004 | De Wilde ....................... 235/385 |
| 2004/0267545 | A1 | 12/2004 | Buchmann et al. |
| 2005/0024211 | A1 * | 2/2005 | Maloney .................... 340/572.1 |

\* cited by examiner

|  |  | CONTROLLED CONTAIN |  |  |  |
|---|---|---|---|---|---|
|  |  | POWER | | | |
| NO | CONDITION | READER | MX | SBC | ANT |
| 1 | FORCE UNLOCK/EMERGENCY | OFF | OFF | OFF |  |
|  | OPERATION MODE | | | | |
| 2 | IDLE/NORMAL | ON | ON | ON | ON |
| 3 | ID ACCEPTED WITH PERSON NEAR CAB | ON | ON | ON | ON |
|  | DRAWER 1 OPEN - CLOSE | ON | ON | ON | FN |
|  | DRAWER 2 OPEN - CLOSE | ON | ON | ON | FN |
|  | DRAWER 3 OPEN - CLOSE | ON | ON | ON | FN |
|  | DRAWER 1-2 OPEN - CLOSE | ON | ON | ON | FN |
|  |  | ON | ON | ON | FN |
|  | DRAWER 1-3 OPEN - CLOSE | ON | ON | ON | FN |
|  |  | ON | ON | ON | FN |
|  | DRAWER 2-3 OPEN - CLOSE | ON | ON | ON | FN |
|  |  | ON | ON | ON | FN |
|  | DRAWER 1,2,3 OPEN - CLOSE | ON | ON | ON | FN |
|  |  | ON | ON | ON | FN |
|  |  | ON | ON | ON | FN |
| 4 | ID ACCEPTED WITH NO PERSON NEAR CAB--AUTOMATIC LOCK AFTER 3 SEC | ON | ON | ON | ON |
| 5 | ONE OR MORE DRAWER STILL OPEN WITH NO PERSON NEAR CAB | ON | ON | ON | ON |
| 6 | ALARM IF CONDITION 4, 5 OCCUR FOR MORE THAN 10 SEC. | ON | ON | ON | OFF |
|  | ADMINISTRATION MODE | | | | |
| 7 | ID ACCEPTED WITH PERSON NEAR CAB | ON | ON | ON | OFF |
|  | DRAWER 1 OPEN - CLOSE | ON | ON | ON | FN |
|  | DRAWER 2 OPEN - CLOSE | ON | ON | ON | FN |
|  | DRAWER 3 OPEN - CLOSE | ON | ON | ON | FN |
|  | DRAWER 1-2 OPEN - CLOSE | ON | ON | ON | FN |
|  |  | ON | ON | ON | FN |
|  | DRAWER 1-3 OPEN - CLOSE | ON | ON | ON | FN |
|  |  | ON | ON | ON | FN |
|  | DRAWER 2-3 OPEN - CLOSE | ON | ON | ON | FN |
|  |  | ON | ON | ON | FN |
|  | DRAWER 1,2,3 OPEN - CLOSE | ON | ON | ON | FN |
|  |  | ON | ON | ON | FN |
|  |  | ON | ON | ON | FN |
| 8 | ID ACCEPTED WITH NO PERSON NEAR CAB FOR MORE THAN 10 SEC. | ON | ON | ON | OFF |
| 9 | ONE OR MORE DRAWER STILL OPEN WITH NO PERSON NEAR THE CAB | ON | ON | ON | OFF |
|  | INVENTORY | | | | |
| 10 | INVENTORY | ON | ON | ON | OFF |
|  | SHUTDOWN | | | | |
| 11 | SHUTDOWN/NO POWER | OFF | OFF | OFF | OFF |

ANT = Antenna    LL = Lock Lamp    AIL = Accept Indicator    S = Proximity Indicator    RA = Scan
L = Lock    AL = Alarm Lamp    DIL = Denied Indicator    MX = Multiplexer    S/L = Drawer
EL = Emergency lock for magnetic lock relay    Input Data = AL, Sensor, S

Fig. 3a

MENT UNIT LOGIC TABLE

| ANT1 | ANT2 | ANT3 | L1 | L2 | L3 | LL | AL | DIL | AIL | S | S1/L1 | S2/L2 | S3/L3 |
|------|------|------|----|----|----|----|----|----|----|----|----|----|----|
|  |  |  | ON | ON | ON |  |  |  |  |  |  |  |  |
|  |  |  |  |  |  |  |  |  |  |  |  |  |  |
| OFF | OFF | OFF | OFF | OFF | OFF | ON | OFF | ON | OFF | OFF | OFF | OFF | OFF |
| OFF | OFF | OFF | ON | ON | ON | ON | OFF | OFF | ON | ON | OFF | OFF | OFF |
| NF | OFF | OFF | ON | ON | ON | OFF | OFF | OFF | ON | ON | NF | OFF | OFF |
| OFF | NF | OFF | ON | ON | ON | OFF | OFF | OFF | ON | ON | OFF | NF | OFF |
| OFF | OFF | NF | ON | ON | ON | OFF | OFF | OFF | ON | ON | OFF | OFF | NF |
| FNS | OFF | OFF | ON | ON | ON | OFF | OFF | OFF | ON | ON | NFS | OFF | OFF |
| OFF | FNS | OFF | ON | ON | ON | OFF | OFF | OFF | ON | ON | OFF | NFS | OFF |
| FNS | OFF | OFF | ON | ON | ON | OFF | OFF | OFF | ON | ON | NFS | OFF | OFF |
| OFF | OFF | FNS | ON | ON | ON | OFF | OFF | OFF | ON | ON | OFF | OFF | NFS |
| OFF | FNS | OFF | ON | ON | ON | OFF | OFF | OFF | ON | ON | OFF | NFS | OFF |
| OFF | OFF | FNS | ON | ON | ON | OFF | OFF | OFF | ON | ON | OFF | OFF | NFS |
| FNS | OFF | OFF | ON | ON | ON | OFF | OFF | OFF | ON | ON | NFS | OFF | OFF |
| OFF | FNS | OFF | ON | ON | ON | OFF | OFF | OFF | ON | ON | OFF | NFS | OFF |
| OFF | OFF | FNS | ON | ON | ON | OFF | OFF | OFF | ON | ON | OFF | OFF | NFS |
| OFF | OFF | OFF | ON | ON | ON | OFF | ON FOR X SEC | OFF | OFF | OFF | OFF | OFF | OFF |
|  | OFF | OFF | ON | ON | ON | OFF | OFF | ON | OFF |  | ON/OFF | ON/OFF | ON/OFF |
| OFF | OFF | OFF | ON | ON | ON | OFF | ON | ON/OFF | ON/OFF | OFF | ON/OFF | ON/OFF | ON/OFF |
|  |  |  |  |  |  |  |  |  |  |  |  |  |  |
| OFF | OFF | OFF | ON | ON | ON | OFF | OFF | OFF | ON | ON | OFF | OFF | OFF |
| NF | OFF | OFF | ON | ON | ON | OFF | OFF | OFF | ON | ON | NF | OFF | OFF |
| OFF | NF | OFF | ON | ON | ON | OFF | OFF | OFF | ON | ON | OFF | NF | OFF |
| OFF | OFF | NF | ON | ON | ON | OFF | OFF | OFF | ON | ON | OFF | OFF | NF |
| FNS | OFF | OFF | ON | ON | ON | OFF | OFF | OFF | ON | ON | NFS | OFF | OFF |
| OFF | FNS | OFF | ON | ON | ON | OFF | OFF | OFF | ON | ON | OFF | NFS | OFF |
| FNS | OFF | OFF | ON | ON | ON | OFF | OFF | OFF | ON | ON | NFS | OFF | OFF |
| OFF | OFF | FNS | ON | ON | ON | OFF | OFF | OFF | ON | ON | OFF | OFF | NFS |
| OFF | FNS | OFF | ON | ON | ON | OFF | OFF | OFF | ON | ON | OFF | NFS | OFF |
| OFF | OFF | FNS | ON | ON | ON | OFF | OFF | OFF | ON | ON | OFF | OFF | NFS |
| FNS | OFF | OFF | ON | ON | ON | OFF | OFF | OFF | ON | ON | NFS | OFF | OFF |
| OFF | FNS | OFF | ON | ON | ON | OFF | OFF | OFF | ON | ON | OFF | NFS | OFF |
| OFF | OFF | FNS | ON | ON | ON | OFF | OFF | OFF | ON | ON | OFF | OFF | NFS |
| OFF | OFF | OFF | ON | ON | ON | OFF | OFF | OFF | ON | OFF | NOF | NOF | NOF |
| NOF | NOF | NOF | NOF | ON | NOF | OFF | OFF | OFF | ON | OFF | NOF | NOF | NOF |
|  |  |  |  |  |  |  |  |  |  |  |  |  |  |
| NFS | NFS | NFS | OFF | OFF | OFF | ON | OFF | OFF | ON | ON | OFF | OFF | OFF |
|  |  |  |  |  |  |  |  |  |  |  |  |  |  |
| OFF | OFF | OFF | OFF | OFF | OFF | OFF | OFF | OFF | OFF | OFF | OFF | OFF | OFF |

D Accepted   NF = On to Off   NFS = On to Off with Sequence   NOF = On or Off
Switch/Lamp   FN = Off to On   FNS = Off to On with Sequence   MD = Administration Mode
L (5-bit)   Output Data = Antenna, Lock, LL, AL, DIL, AIL (10-bit)

Fig. 3b

| NO | CONDITION | CONTROLLED CONTAINMENT UNIT | | | |
|---|---|---|---|---|---|
| | | INPUT DATA | | | |
| | | RA | MD | S | S/L |
| 1 | FORCE UNLOCK/EMERGENCY | | | | |
| | OPERATION MODE | | | | |
| 2 | IDLE/NORMAL | 0 | 0 | 0,1 | .000. |
| 3 | ID ACCEPTED WITH PERSON NEAR CAB | 1 | 0 | 1 | .000. |
| | DRAWER 1 OPEN - CLOSE | 1 | 0 | 1 | 001 to 000 |
| | DRAWER 2 OPEN - CLOSE | 1 | 0 | 1 | 010 to 000 |
| | DRAWER 3 OPEN - CLOSE | 1 | 0 | 1 | 100 to 000 |
| | DRAWER 1-2 OPEN - CLOSE | 1 | 0 | 1 | 011 to 000 |
| | DRAWER 1-3 OPEN - CLOSE | 1 | 0 | 1 | 101 to 000 |
| | DRAWER 2-3 OPEN - CLOSE | 1 | 0 | 1 | 110 to 000 |
| | DRAWER 1,2,3 OPEN - CLOSE | 1 | 0 | 1 | 111 to 000 |
| 4 | ID ACCEPTED WITH NO PERSON NEAR CAB–AUTOMATIC LOCK AFTER 3 SEC | 1 | 0 | 0 | .000 |
| 5 | ONE OR MORE DRAWER STILL OPEN WITH NO PERSON NEAR CAB | 1 | 0 | 0 | 001,010 011, 101 110, 111 100 |
| 6 | ALARM IF CONDITION 4, 5 OCCUR FOR MORE THAN 10 SEC. | | | | |
| | ADMINISTRATION MODE | | | | |
| 7 | ID ACCEPTED WITH PERSON NEAR CAB | 1 | 1 | 1 | .000. |
| | DRAWER 1 OPEN - CLOSE | 1 | 1 | 1 | 001 to 000 |
| | DRAWER 2 OPEN - CLOSE | 1 | 1 | 1 | 010 to 000 |
| | DRAWER 3 OPEN - CLOSE | 1 | 1 | 1 | 100 to 000 |
| | DRAWER 1-2 OPEN - CLOSE | 1 | 1 | 1 | 011 to 000 |
| | DRAWER 1-3 OPEN - CLOSE | 1 | 1 | 1 | 101 to 000 |
| | DRAWER 2-3 OPEN - CLOSE | 1 | 1 | 1 | 110 to 000 |
| | DRAWER 1,2,3 OPEN - CLOSE | 1 | 1 | 1 | 111 to 000 |
| 8 | ID ACCEPTED WITH NO PERSON NEAR CAB FOR MORE THAN 10 SEC. | 1 | 1 | 0 | .000. |
| 9 | ONE OR MORE DRAWER STILL OPEN WITH NO PERSON NEAR THE CAB | 1 | 1 | 0 | 001, 010, 011, 101, 110, 111, 100 |
| | INVENTORY | | | | |
| 10 | INVENTORY | 1 | 3 | 0,1 | .000. |
| | SHUTDOWN | | | | |
| 11 | SHUTDOWN/NO POWER | | | | |

Fig. 4a

| MENT UNIT LOGIC TABLE | | | | | | | | | |
|---|---|---|---|---|---|---|---|---|---|
| DATA | | NOTE | OUTPUT DATA | | | | | | NOTE |
| S/L | DEC | | ANT | LOCK | LL | AL | DIL | AIL DEC | |
| | | MANUAL KEY | | | | | | | OPEN ALL LOCK |
| 000 | 0,8 | NORMAL | 111 | 000 | 1 | 0 | 0 | 0 226-0 | |
| 000 | 40 | | 111 | 111 | 0 | 0 | 0 | 1 252-1 | |
| 001 to 000 | 41 | DRAW 1 OP/CL | 110 | 111 | 0 | 0 | 0 | 1 220-1 | |
| 010 to 000 | 42 | DRAW 2 OP/CL | 101 | 111 | 0 | 0 | 0 | 1 188-1 | |
| 100 to 000 | 44 | DRAW 3 OP/CL | 100 | 111 | 0 | 0 | 0 | 1 156-1 | |
| 011 to 000 | 43 | DRAW 1,2 OP/CL | 110 | 111 | 0 | 0 | 0 | 1 220-1 | 1,2 ANT. CYCLE |
| | | | 101 | 111 | 0 | 0 | 0 | 1 188-1 | |
| 101 to 000 | 45 | DRAW 1,3 OP/CL | 110 | 111 | 0 | 0 | 0 | 1 220-1 | 1,3 ANT. CYCLE |
| | | | 100 | 111 | 0 | 0 | 0 | 1 156-1 | |
| 110 to 000 | 46 | DRAW 2,3 OP/CL | 101 | 111 | 0 | 0 | 0 | 1 188-1 | 2,3 ANT. CYCLE |
| | | | 100 | 111 | 0 | 0 | 0 | 1 156-1 | |
| 111 to 000 | 47 | DRAW 1,2,3 OP/CL | 110 | 111 | 0 | 0 | 0 | 1 220-1 | 1,2,3 ANT. CYCLE |
| | | | 101 | 111 | 0 | 0 | 0 | 1 188-1 | |
| | | | 100 | 111 | 0 | 0 | 0 | 1 156-1 | |
| 000 | 32 | | 111 | 111 | 0 | 1 | 0 | 1 253-1 | AUTOMATIC LOCK |
| | | | 111 | 000 | 1 | 0 | 0 | 0 226-0 | NORMAL CONDITION |
| 001,010 011,101 110,111 100 | 33,34 35,37 28,29 36 | NEED TO CLOSE ALL DRAWER TO ENTER NORMAL CONDITION | 111 | 111 | 0 | 1 | 0 | 1 253-1 | TRY TO LOCK |
| | | | | | | | | | IF FAILED GO TO |
| | | | 111 | 000 | 1 | 0 | 0 | 0 226-0 | CONDITION 6 |
| | | NEED TO CLOSE ALL DRAWER TO ENTER NORMAL CONDITION | | | | | | | ALARM UNTIL DRAWER CLOSE |
| | | | 111 | 000 | 0 | 1 | 0 | 1 225-1 | |
| 000 | 112 | | 111 | 111 | 0 | 0 | 0 | 1 252-1 | |
| 001 to 000 | 57 | DRAW 1 OP/CL | 110 | 111 | 0 | 0 | 0 | 1 220-1 | |
| 010 to 000 | 58 | DRAW 2 OP/CL | 101 | 111 | 0 | 0 | 0 | 1 188-1 | |
| 100 to 000 | 60 | DRAW 3 OP/CL | 100 | 111 | 0 | 0 | 0 | 1 156-1 | |
| 011 to 000 | 59 | DRAW 1,2 OP/CL | 110 | 111 | 0 | 0 | 0 | 1 220-1 | 1,2 ANT. CYCLE |
| | | | 101 | 111 | 0 | 0 | 0 | 1 188-1 | |
| 101 to 000 | 61 | DRAW 1,3 OP/CL | 110 | 111 | 0 | 0 | 0 | 1 220-1 | 1,3 ANT. CYCLE |
| | | | 100 | 111 | 0 | 0 | 0 | 1 156-1 | |
| 110 to 000 | 62 | DRAW 2,3 OP/CL | 101 | 111 | 0 | 0 | 0 | 1 188-1 | 2,3 ANT. CYCLE |
| | | | 100 | 111 | 0 | 0 | 0 | 1 156-1 | |
| 111 to 000 | 63 | DRAW 1,2,3 OP/CL | 110 | 111 | 0 | 0 | 0 | 1 220-1 | 1,2,3 ANT. CYCLE |
| | | | 101 | 111 | 0 | 0 | 0 | 1 188-1 | |
| | | | 100 | 111 | 0 | 0 | 0 | 1 156-1 | |
| | | | 111 | 111 | 0 | 0 | 0 | 1 252-1 | AUTOMATIC LOCK |
| 000 | 48 | | 111 | 000 | 0 | 0 | 0 | 1 226-0 | NORMAL CONDITION |
| 001,010, 011,101, 110,111, 100 | 49,50 51,53 54,55 52 | NEED TO CLOSE ALL DRAWER TO ENTER NORMAL CONDITION | 111 | 111 | 0 | 1 | 0 | 1 253-1 | TRY TO LOCK |
| | | | | | | | | | IF FAILED GO TO |
| | | | 111 | 000 | 1 | 0 | 0 | 0 226-0 | CONDITION 6 |
| 000 | | | 110 | 111 | 0 | 0 | 0 | 1 220-1 | 1,2,3 ANT. CYCLE |
| | | | | | | | | | ALL LOCK |

Fig. 4b

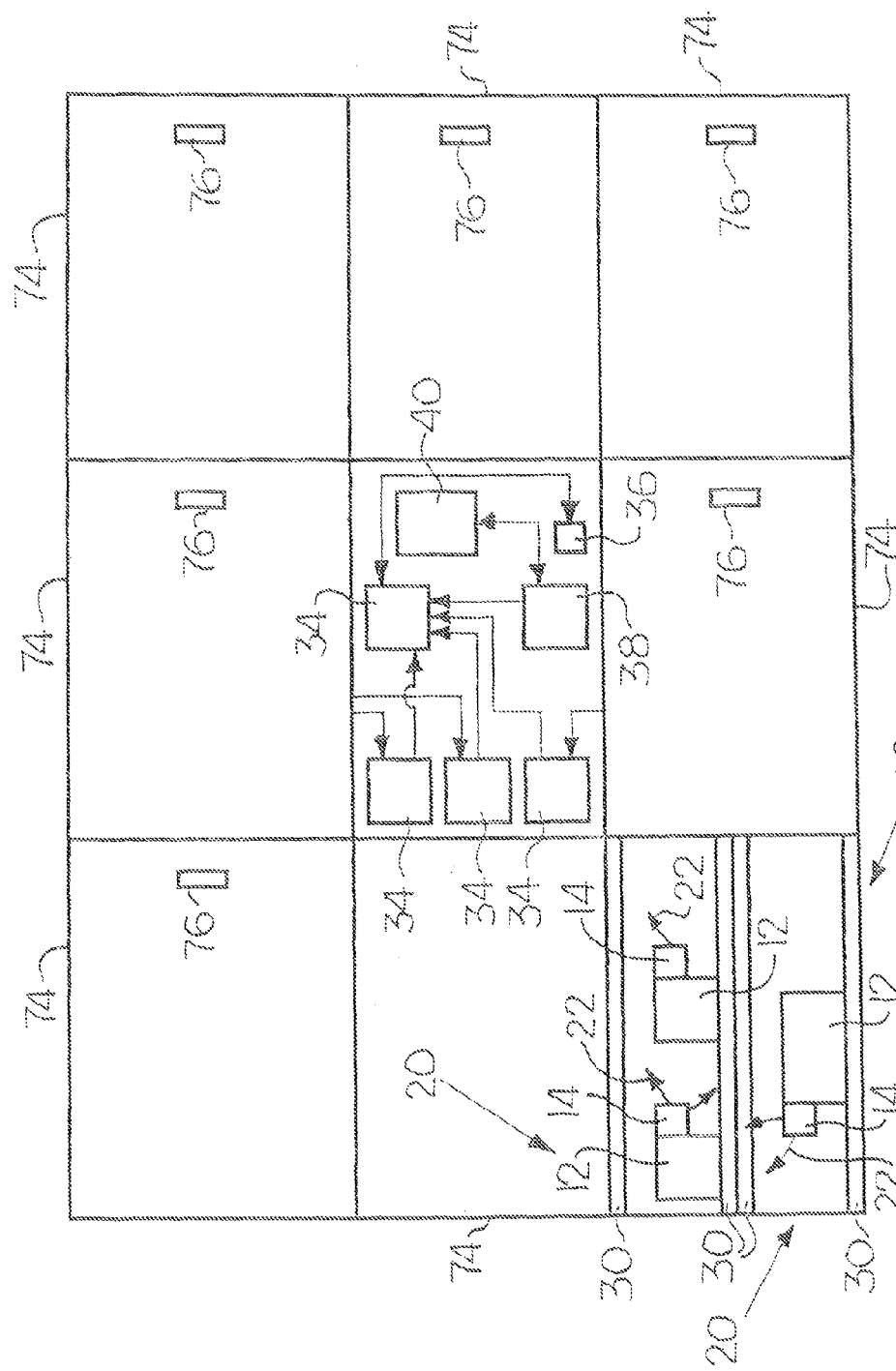

DYNAMIC CONTROL CONTAINMENT UNIT

CROSS REFERENCE TO RELATED APPLICATIONS

This application is a continuation application of U.S. patent application Ser. No. 12/240,022, filed Sep. 29, 2008, which is a continuation of U.S. patent application Ser. No. 10/209,348, filed Jul. 31, 2002, which claims the benefit of priority to U.S. Provisional Patent Application Ser. No. 60/344,920, filed Dec. 21, 2001, all of which are incorporated herein by reference in their entirety.

BACKGROUND OF THE INVENTION

1. Field of the Invention

The present invention relates generally to control containment systems and apparatus, containing multiple and discrete items and, in particular, to a radio frequency identification system for securely tracking items.

2. Description of Related Art

In many industrial and service applications, multiple items must be tracked for a variety of reasons. For example, these items may be tracked so that the user knows when additional items should be obtained or ordered, who is using the items and for what purpose, and for expensive items, a secure tracking system is required. Whether for security purposes or inventory purposes, an identification system must be developed in order to accurately track and manage a large amount of items, typically discrete and small items.

Health care delivery institutions, like hospitals, have a large amount of inventory to control throughout their system. Thousands of items move in and out of supply and operating rooms every day, and the system administrators must be sure to know exactly what items are being used, when they are being used, who is using them, and how often. At all times, items must be accounted for, and must be fully stocked.

Currently, most hospitals maintain and control their inventory manually by recording it on paper. Items are often ordered on an as-needed basis, as the inventory becomes low. The hospital's materials management department usually must go through the various peripheral supply rooms at the hospital, visually taking note and recording on paper the inventory status of supplies. A purchase order is then sent to the hospital's distributors, requesting more of an item that is low in supply. When the ordered items are received at the hospital's central supply, a materials management person must manually go through and compare every item received versus the packing list. Next, the peripheral supply rooms are restocked with the ordered items from the central supply room.

When an item is used during an operation, the nurse or clinician usually removes it from the central or peripheral supply room and records its use on paper. Typically, there is little accountability as to what has been taken, who took it, and how many they took. The current method of maintaining and controlling inventory is both labor intensive and imprecise. In many instances, a nurse must manually record every item that is being used. The information is only as accurate as to what has been recorded. During busy times, the information garnered is inaccurate or the entire process is sometimes skipped.

In order to effectively track items, supply cabinets have been developed, which provide inventory, accountability, and security of supplies, e.g., medical supplies. The prior art cabinets utilize manual input systems. To gain access to a cabinet, the user must keypunch on a keyboard their access information, such as a PIN number. A door to the cabinet is unlocked once the internal computer accepts the access information. The supply items are separated into bins by type, and as a user takes out an item, they must also push a button, indicating that they have taken out that item. This action of manual input causes the system to decrement the item from inventory.

SUMMARY OF THE INVENTION

It is an object of the present invention to provide a dynamic control containment unit for holding a plurality of discrete items, which overcomes the deficiencies of the prior art. It is another object of the present invention to provide a control containment unit that is capable of securely tracking multiple items, which are added to and removed from the unit from various dynamic, non-predetermined locations. It is yet another object of the present invention to provide a control containment unit that is capable of accurately inventorying its entire contents, as well as the contents of any individual receptacle.

The present invention is a dynamic control containment unit for holding a plurality of discrete items, and includes a signal emitting mechanism associated with each of the plurality of discrete items. An enclosed housing, having at least one receptacle accessible by a user, is included, and each receptacle has a plurality of items contained therein. A passive signal receiving mechanism is in communication with the receptacle and receives signals emitted from the signal emitting mechanism. A controller is in communication with the signal receiver mechanism and is able to initiate actions based upon the signal content. The control containment unit also includes a securement system for preventing access to the unit. In a preferred embodiment, the receptacle is a drawer, which is slidable with respect to the housing, such that the receptacle may be slid open, thereby providing access to the items contained in the receptacle. The controller is used to track and manage the inventory contained in the unit. In another preferred embodiment, the receptacle is a shelf, which is recessed within the control containment unit and covered by a door.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWINGS

FIG. 3 is a logic table illustrating a preferred logic sequence used in operating the dynamic control containment unit of FIG. 1;

FIG. 4 is an input/output data table associated with a controller in the dynamic control containment unit of FIG. 1; and FIG. 5 is a schematic view of a further preferred embodiment of a dynamic control containment unit according to the present invention.

DETAILED DESCRIPTION OF THE PREFERRED EMBODIMENTS

Figure 1:
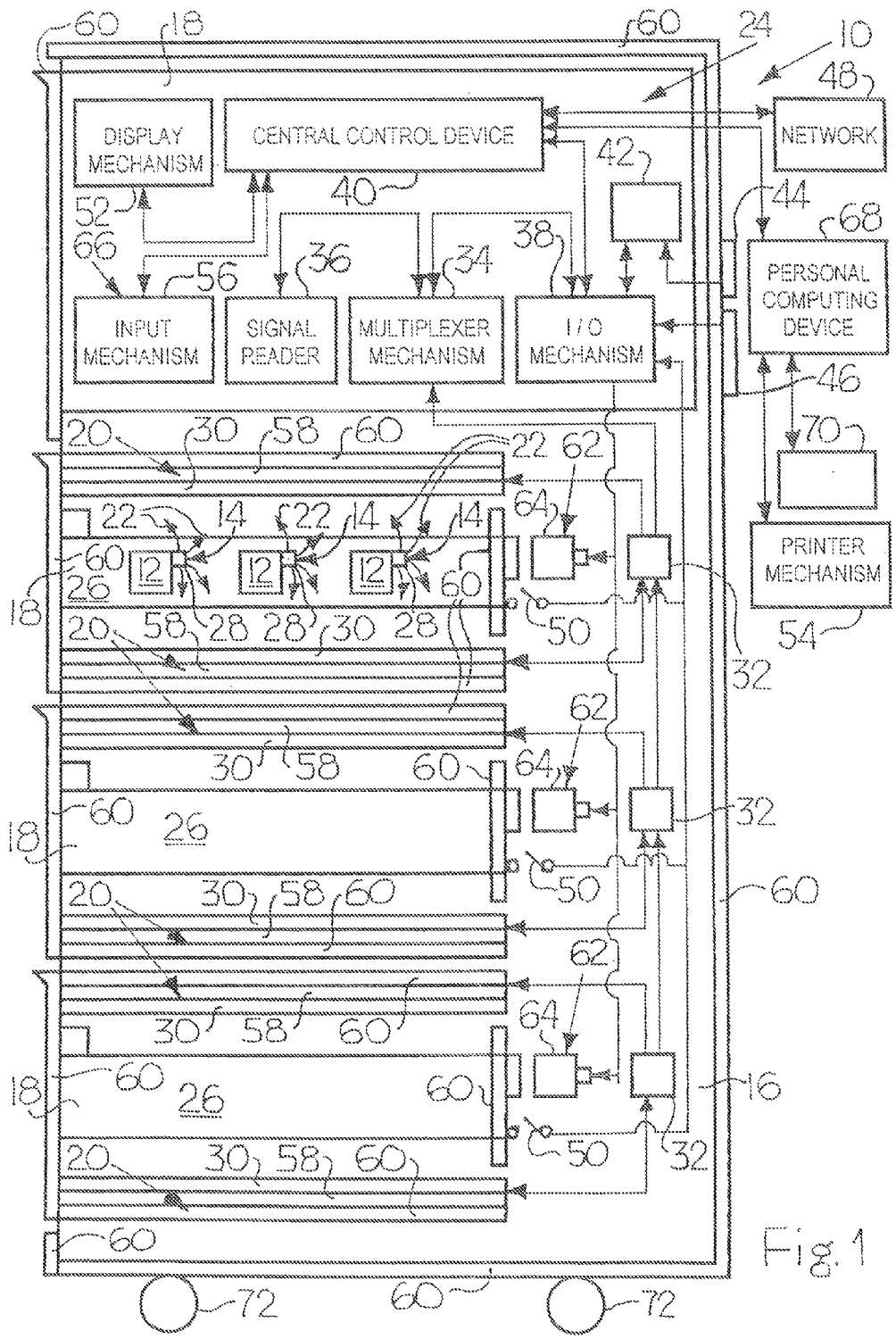
FIG. 1 is a schematic view of a preferred embodiment of a dynamic control containment unit according to the present invention.
Figure 2:
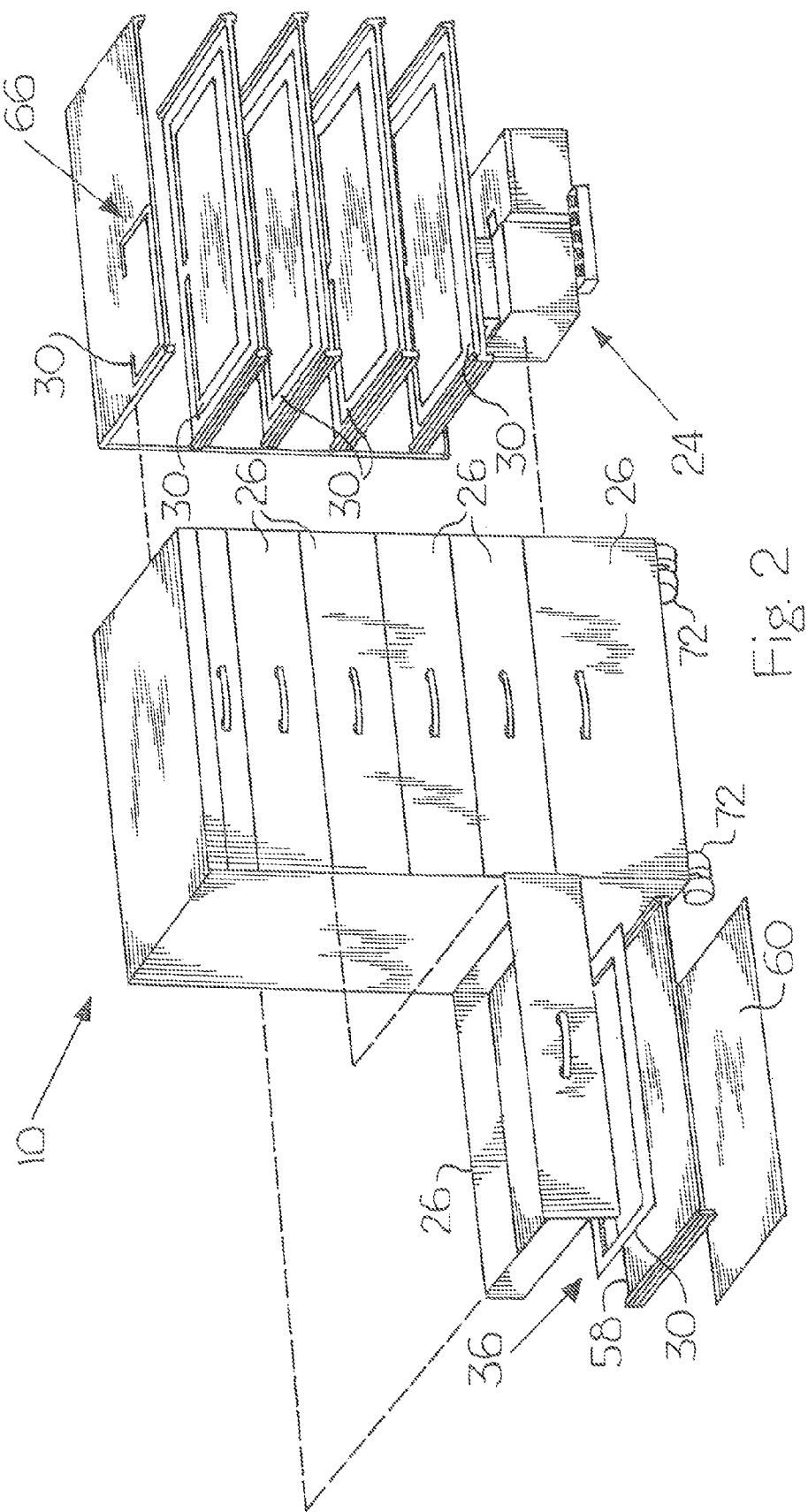
FIG. 2 is an exploded, perspective view of another embodiment of a dynamic control containment unit according to the present invention.

The present invention is a dynamic control containment unit 10 for holding multiple, discrete items 12 and is illustrated in FIGS. 1 and 2. Each of the items 12 has a signal emitting mechanism 14 associated with it. The control containment unit includes a housing 16 having multiple receptacles 18, which are accessible to a user. The items 12 and their associated signal emitting mechanisms 14 are contained in the receptacle 18. The control containment unit is dynamic, in that the items 12 can be placed in any position in any receptacle 18. Therefore, the items 12 do not have to be placed in predetermined locations or receptacles 18, such as assigned bins or the like.

A passive signal receiving mechanism 20 is in communication with the receptacles 18 and receives signals 22 emanating from the signal emitting mechanisms 14. A controller 24 is in communication with the signal receiving mechanism 20 and is able to initiate various actions based upon the content of the signals 22 received by the signal receiving mechanism 20. The receptacle 18 could be a drawer, a shelf, a box, a container, etc. Further, the items 12 could be objects, supplies, assets, instruments, etc.

In a preferred embodiment, the receptacle 18 is a drawer 26. This drawer 26 is slidable with respect to the housing 16, such that it may be slid open and provide access to the items 12 contained therein. In this preferred embodiment, the signal emitting mechanisms 14 are radio frequency identification (RF/ID) transponders 28. Each of these RF/ID transponders 28 are attached to or associated with an individual item 12. Further, each of these RF/ID transponders 28 emit a signal 22, which is unique to the item 12 to which the RF/ID transponder 28 is attached to or associated with. After the RF/ID transponder 28 has been attached or associated with the item 12, it is placed in the receptacle 18 or drawer 26. While the preferred embodiment illustrates three item-containing drawers, any number of drawers 26 may be utilized, and the number of drawers 26 would not effect the functionality of the control containment unit 10.

In a preferred embodiment, as illustrated in FIG. 1, the signal receiving mechanism 20 is an antenna 30, which is capable of receiving the radio frequency signals 22 emanating from the RF/ID transponders 28. While a single antenna 30 may be placed underneath the drawer 26, as illustrated in FIG. 2, in the preferred embodiment, two antennas 30 are used, one antenna 30 immediately above the drawer 26, and one antenna 30 immediately below the drawer 26. This allows for greater accuracy in receiving the signals 22 from the signal emitting mechanisms 14 or RF/ID transponders 28. When the drawer 26 is in the closed position, the items 12 (and subsequently the RF/ID transponders 28) are positioned in the control containment unit 10, such that they are located in the antenna 30 field. The RF/ID transponders 28 are energized by the antenna field and emit a radio frequency signal 22 corresponding to its unique identification, typically an identification number. The signals 22 are picked up by the antenna 30 and communicated to the controller 24. While the signals 22 emanating from the signal emitting mechanisms 20 typically have a characteristic unique to a specific item 12, it is also envisioned that the signal emitting mechanisms 20 may emit signals 22 unique to a group, set, or other association of multiple items 12. In addition, in this preferred embodiment, the two antennas 30 are positioned, such that they are dedicated to receiving signals 22 emanating from an assigned receptacle 18 or drawer 26. This arrangement allows the signal receiving mechanism 20 to passively receive the signals 22, as opposed to necessitating the specific movement of an item 12 across a stationary reading device.

The controller 24 is in communication with a tuning mechanism 32. This tuning mechanism 32 is used to set a frequency parameter of the signal receiving method 20 or antenna 30. The receptacle 18 or drawer 26 could also have an associated indicator light (not shown), possibly on its outside surface, to indicate exactly which receptacle 18 the user has access to.

In the preferred embodiment the controller 24 includes a multiplexor mechanism 34, which is in communication with the signal receiving mechanism 20 or antenna 30 and provides an output signal corresponding to the signal 22 received by the signal receiving mechanism 20. The multiplexor mechanism 34 is also in communication with a signal reader mechanism 36. This signal reader mechanism provides an output signal corresponding to the signal received by the multiplexor mechanism 34.

An input/output mechanism 38 is in communication with the multiplexor mechanism 34 and/or the signal reader mechanism 36 and translates output signals into digital output signals. A central control device 40 is in communication with the input/output mechanism 38 and receives, processes, and transmits signals, as well as initiates actions, based upon the digital output signals received from the input/output mechanism 38.

The signals 22 received by the antennas 30 are sent through the multiplexor mechanism 34 to the signal reader mechanism 36, which is an internally-located RF/ID reader. The multiplexor mechanism 34 collects signals from more than one antenna 30 and communicates with a single signal reader mechanism 36. In addition, the multiplexor mechanism 34 allows each antenna 30 to be uniquely addressable and subsequently individually control by the controller 24. The signal reader mechanism 36 decodes the signal, and communicates this decoded signal to the central control device 40 via the input/output mechanism 38. Next, the central control device 40 identifies the signals 22, associates the signals 22 with the correct items 12 and logs the identification of the items 12 into an inventory database, maintained on the central control device 40.

The controller 24 also includes a power control module 42, which is in communication with the input/output mechanism 38. This power control module 42 provides specified power outputs at specified power levels to the various components of the controller 24. Further, the power control module 42 may be operated or activated by a single power switch 44. Therefore, a user need only operate a single power switch 44 to power all the various components of the controller 24 and the control containment unit 10. The control containment unit 10 may also include a backup power module 46 in communication with the input/output mechanism 38 in order to supply power in the event of an electronic power failure.

The central control device 40 may be a programmable microchip, a microcontroller, a personal computer, a hand-held computer, a terminal, a network computing device, etc. When used in a network relationship, the central control device 40 communicates with a network 48, which would allow a user or system administrator to administrate, control and manage multiple control containment units 10 throughout a building.

In the preferred embodiment, the control containment unit 10 includes a switch mechanism 50, which is in operable communication with the receptacle 18 or drawer 26. As a user is opening a particular drawer 26, the switch mechanism 50 moves to an open position, and indicates to the central control device 40 via the input/output mechanism 38, that it has been opened. The central control device 40, or software contained thereon, sends signals to the multiplexor mechanism 34, commanding it to begin reading input from the antennas 30 associated with the particular drawer 26 that has been opened. By comparing the inventory of the drawer 26 before and after it was opened, the central control device 40 may identify items 12 removed from the drawer 26. The control containment unit 10 includes a display mechanism 52 in communication with the central control device 40 for providing a visual display to a user. It is envisioned that various information may be displayed to the user, whether in graphical or textual format, on the display mechanism 52. For example, the display mechanism 52 may display an action initiated by the central control device 40, a use history, an item 12 history, a user history, user data, item 12 data, inventory data, receptacle 18 or drawer 26 data, control containment unit 10 data, a receptacle 18 or drawer 26 inventory, a control containment unit 10 inventory, etc. In a preferred embodiment, the display mechanism 52 is located on the housing 16 at an area easily viewable by a user. However, the display mechanism 52 may be a monitor positioned on or adjacent the control containment unit 10.

The control containment unit 10 also may include a printer mechanism 54, which is in communication with the central control device 40, for providing visual printouts corresponding to the information processed by the central control device 40. For example, any of the information discussed above in connection with the display mechanism 52 may also be printed out in a physical format by the printer mechanism 54.

The control containment unit 10 also has an input mechanism 56 in communication with the central control device 40 and capable of receiving user input and transmitting user input signals to the central control device 40. The input mechanism 56 may be a keypad, a touch display, a personal computing device, a hand-held computing device, a magnetic reading device, a radio frequency identification reading device, a bar code reading device, a light pen, a keyboard, a mouse, a terminal, voice activation/verification, biometric readers, etc. In the preferred embodiment, the input mechanism 56 is positioned adjacent or near the display mechanism 52, thereby allowing a user to visually see his or her input as the input mechanism 56 receives the data. As with the display mechanism 52, the input mechanism 56 is positioned at a convenient area, easily accessible by many users. The input mechanism 56 may also be in communication with an antenna 30, which would allow a user to provide initial radio frequency identification signals for each item 12 to the central control device 40.

In the preferred embodiment, each antenna 30, which receives the radio frequency signals 22 emanating from the signal emitting mechanism 20 or the RF/ID transponders 28 is positioned adjacent the drawer 26 by a central panel element 58. As seen in FIG. 2, the antenna 30 is rested upon the central panel element 58 when used in connection with the bottom antenna 30, and is attached to the central panel element 58 when used in connection with the top antenna 30. On a side opposite the antenna 30 of the central panel element 58, a shielding element 60 is attached. The shielding element 60 prevents signals from passing therethrough. This prevents items 12 in other drawers 26 located above or below the object drawer 26 from being read during the reading process. This will prevent confusion by the central control device 40 and isolation of each individual drawer 26. Not only may each drawer 26 have shielding element 60 associated with it, the control containment unit 10, and specifically the housing 16, may also include a shielding element 60. This would ensure that signals emanating from all of the drawers 26 would not pass through the housing 16 of the control containment unit 10.

The control containment unit 10 includes a lock mechanism 62, associated with each drawer 26. These lock mechanisms 62 are in communication with the central control device 40 via the input/output mechanism 38 and serve to prevent access to the drawer 26 based upon action signals sent by central control device 40. In the preferred embodiment, the lock mechanism 62 are magnetic locks 64, which based upon signals received from the central control device 40, may activate and attract a portion of the drawer 26. This would prevent the drawer 26 from sliding and providing access to an unauthorized user. It is this lock mechanism 62, together with the user authorization and control system, that create a securement system. The securement system, therefore, prevents any unauthorized access to the control containment unit 10. It is also envisioned that a physical master key is provided and capable of allowing authorized access to the control containment unit 10 during a power outage or other emergency situation.

The signal emitting mechanism 14, in the form of an RF/ID transponder 28, may be a tag or label affixed to each item 12. As discussed above, this tag or label would emit a unique signal corresponding to the identity of the item 12. In order to provide initial input to the central control device 40 of the item 12 identity, the input mechanism 56 may include a recognition signal receiver 66 in communication with the central control device 40. This recognition signal receiver 66 may receive initial input signals corresponding to the identity of the items 12. As seen in FIG. 2, in another embodiment, the recognition signal receiver 66 is an antenna 30 located on the control containment unit 10. This antenna 30 would serve two purposes. First, this antenna 30 increases utility administration. As the RF/ID transponder 28 is affixed to an item 12, the RF/ID transponder 28 is read and its unique identification must be associated with that particular item 12. This will allow the item 12 to be identified later when the RF/ID transponder 28 is read in the drawers 26.

The second purpose of this antenna 30 is to allow selective access to the control containment unit 10 and its drawers 26 as part of the securement system. Depending upon the configuration of the control containment unit 10, a user may have an identification badge, also affixed with an RF/ID tag, which they may wave over the antenna 30, the recognition signal receiver 66 and/or the input mechanism 56. As a unique identification of the RF/ID tag is read, the central control device 40 identifies the tag user with a list of those who have access to the control containment unit 10 or the specific drawer 26. If there is a match, the central control device 40 sends a signal to the lock mechanism 62 via the input/output mechanism 38 in a relay to unlock all of the drawers 26 or a specific drawer 26.

All of the display mechanism 52, input mechanism 56, central control device 40, input/output mechanism 38, signal reader mechanism 36, multiplexor mechanism 34 and power control module 42 are housed within the control containment unit 10 and, in a preferred embodiment, in a top slidable drawer 26. This would allow a user access to the components for programming, repair and maintenance.

The control containment unit 10 may also include an associated personal computing device 68 associated with the central control device 40 or in place of the central control device 40. In addition, the personal computing device 68 may have a personal computing device input mechanism 70 for providing data input into the personal computing device 68. This personal computing device 68 would allow a user or administrator to interact with software on the personal computing device 68 for controlling the control containment unit 10 or directly with the central control device 40 in the drawer 26 of the control containment unit 10. Further, this personal computing device 68 may have functionality, such that it can program, modify, maintain and otherwise control the central control device 40 in the control containment unit 10. Further, in order to provide easy movement of a specific control containment unit 10 to a different area in a building, the control containment unit 10 may have wheels 72 attached to the housing 16 for easy movement.

FIG. 3 details a logic table and sequences for different conditions, together with what is transmitted and written through the input/output mechanism 38 and read from the input/output mechanism 38. FIG. 4 is in input/output data table for describing the conditions and what input data and output data are provided in communications in the controller 24.

In a further preferred embodiment, as illustrated in FIG. 5, the control containment unit 10 and, in particular, the housing 16, may take the form of a cabinet with multiple access points. In this embodiment, the receptacle 18 is a shelf and, as described above, each shelf would have one or more antennas 30 for receiving signals 22 from the signal emitting mechanisms 14 attached to the items 12. However, as the receptacles 18 are not drawers, as in the previous embodiment, a door 74 or other cover is used to prevent and/or control access to the receptacles 18. It is envisioned that the door would have a handle 76 to allow a user to open the door 74.

As seen in FIG. 5, the control containment unit 10 has multiple doors 74, with each door 74 covering multiple receptacles 18 in the form of shelving. Upon accessing or opening a door 74, the signal receiving mechanism 20 would be activated in order to read the signals 22 emitted from the signal emitting mechanism 14 on the items 12. After the door 74 is closed, again the signal receiving mechanism 20 would receive signals 22 from the signal emitting mechanism 14 on the items 12 in order to determine what items 12 have been taken from the receptacle 18.

As discussed above, the securement system ensures that a user would need to gain authorization from the control containment unit 10 in order to gain access to one or more of the receptacles 18 behind the door 74. Users could be grouped in access levels or authorization levels. In order to further enhance security, the doors 74 may have an automatic closing device, which would shut and open a door 74 after a certain period of time elapses. In addition, the doors 74 could have an urging mechanism, which would simply urge the door 74 in a closed position when released. In this embodiment, it is the door 74 that would have an associated lock mechanism 62, for preventing access, as opposed to each individual drawer 26 described above in connection with the previous embodiment.

FIG. 5 illustrates this preferred embodiment with one of the doors 74 removed, as well as a door 74 covering the controller 24 also removed. In this embodiment, and due to the number of signal receiving mechanisms 20 (or antennas 30), multiple multiplexor mechanisms 34 could be utilized. For example, for each row or column of receptacles 18 or groups of receptacles 18, a single multiplexor mechanism 34 could be used. This would increase the speed and control of signal 22 and information processing. If multiple multiplexor mechanisms 34 are used, each of these multiplexor mechanisms 34 would be in communication with a main or central multiplexor mechanism 34, which would operate as described hereinabove in connection with the previous embodiment.

It is also envisioned that the control containment unit 10 described above could take the form of a room. In this case, a user would need to gain access to the room, and possibly only certain portions of the room, and would remove items 12 from receptacles 18 (such as shelving) placed throughout the room. In essence, the room would function as a giant cabinet or control containment unit 10 described hereinabove. Obviously, whether in the form of a cabinet or a room, the control containment unit 10 would preferably have one, and typically multiple, shielding elements 60 to prevent emanation of signals 22 from exiting the area.

EXAMPLE

The present invention is particularly useful in the field of medicine, and, in particular, at hospitals. In a hospital application, the items 12 are typically medical items, such as containers of medicine, medical devices, etc. A specific example of the use of the control containment unit 10 in connection with a hospital follows.

Items 12 are received from a distributor or manufacturer at the hospital's central supply room, with the RF/ID transponder 28, in the form of a tag or label, already affixed to the item 12, using a set tag-to-item association scheme. If the item 12 arrives with no RF/ID transponder 28 attached, hospital employees can affix the RF/ID transponder 28 themselves and perform the tag-to-item association using the input mechanism 56 or recognition signal receiver 66 located on the housing 16. The employee then waves his or her RF/ID badge over the input mechanism 56 or recognition signal receiver 66, thereby causing the drawers 26 of the control containment unit 10 to open. The items 12 are then placed inside the drawers 26 and closed. As soon as the drawers 26 are closed, the controller 24 performs a comparison between the inventories of the drawer 26 before and after it was opened to determine who placed what items inside. The inventorying is done automatically by the central control device 40.

During operational use, nurses or clinicians wave their RF/ID badge over the input mechanism 56 or recognition signal receiver 66, thereby unlocking the control containment unit 10. They may then open the drawers 26 to which they have authorized access and take whatever items 12 they need. There is no need for nurses or clinicians to keypunch an access code or press a button to indicate that they have taken an item 12. As soon as the drawers 26 are closed, items 12 removed from the drawers 26 are automatically associated with the person who just opened the drawer 26. The controller 24 or central control device 40 then subtracts the items 12 from the inventory.

During idle periods, the controller 24 performs inventories at set intervals. If a particular item 12 inventory is below a set par level, the controller 24 may send a message to the hospital's billing and purchasing system to purchase more of that particular item 12 over the network 28.

In this manner, the present invention provides a control containment unit 10, such as a cabinet, utilizing RF/ID technologies to dispense supplies with security and accountability, without the need for any data entry. The present invention has many advantages over existing devices and methods for controlling inventory. The first advantage is its security and accountability features, as compared to current systems. The controller 24 or controller software not only provide access to a set group of people, but knows exactly what they have taken. Prior art paper-based systems typically have minimal or no security involved, or are difficult to implement. Although prior art solutions provide some security, the user must "keypunch" in their access code. Also, prior art solutions do not provide "real" inventory levels, instead providing a "calculated" virtual inventory level, based upon actions, such as pushing a button. If the user takes out two items 12, but only pushes the button for one, there is no way to detect this error. The present invention performs a "true" inventory of the control containment unit 10.

Another advantage of the present invention is reduction in errors involved in performing inventory. With paper-based systems, the information is only as good as the writer's accuracy. If nurses or clinicians are busy, the inventory information can often be erroneous. As mentioned above, the push-button system can also have these errors.

Yet another advantage of the present invention is the speed to perform inventory and to place items 12 into inventory. A user can perform a "true" inventory of all the items 12 in the cabinet in a matter of seconds, instead of hours using the paper-based system. An item 12 can be placed into inventory by simply putting it inside the drawers 26. Since no manual data entry is required, the labor savings can be tremendous.

Another advantage is the true real-time and dynamic inventory capability. The controller 24 or software control system can be set to perform inventory at regular intervals, down to the second. Another advantage is that par levels can be maintained with this invention. As soon as the control containment unit 10 detects a low supply of a certain item 12 in a drawer 26, alerts or messages can be sent to the hospital purchasing system or to a system administrator. The present invention also provides for the auto return of items 12. If a user takes out two items 12 but only uses one, the item 12 can be put into inventory by simply placing it back into the drawer 26. There is no data entry required. The controller 24 automatically detects who returned what item 12 back into which drawer 26.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A dynamic control containment unit for holding a plurality of discrete items, comprising:
    a housing including a plurality of receptacles positioned therein and defining an associated inner area;
    at least one radio frequency identification transponder associated with each item of the plurality of discrete items and configured to emit a radio frequency signal including a characteristic unique to a specific item or group of items of the plurality of discrete items;
    at least one antenna mechanism integrated with at least one surface bounding the inner area and dedicated to receiving signals emanating from an assigned inner area associated with at least one receptacle of the plurality of receptacles, the at least one antenna mechanism configured to receive the radio frequency signals emitted from the at least one transponder, including the characteristic unique to a specific item or group of items, wherein at least one of the plurality of items is positionable within the inner area in any position or orientation, and wherein the at least one item is accessible by accessing the at least one receptacle;
    a central control device operatively coupled to the at least one antenna mechanism and configured to receive signals therefrom;
    at least one receptacle shielding element associated with each of the plurality of receptacles to prevent signals associated with items positioned in one of the plurality of receptacles from being read by the at least one antenna mechanism when the at least one antenna mechanism is receiving signals emanating from another of the plurality of receptacles;
    a housing shielding element associated with the housing to prevent signals emanating from the plurality of receptacles from passing through the housing; and
    a securement system comprising:
        (a) an automated lock mechanism for preventing unauthorized access to the inner area associated with the plurality of receptacles; and
        (b) a radio frequency identification transponder input mechanism configured to communicate with the at least one antenna such that the transponder input mechanism receives and transmits user data from a user of the unit to the central control device, the user data comprising access level data or authorization level data associated with a specified user,
    wherein the central control device is configured to: (i) update an inventory database of the plurality of items in the enclosed housing based upon the characteristic unique to a specific item or group of items emitted from the at least one transponder; (ii) associate the user that has accessed the inner area and/or unit with each item that is added or removed from the inner area and/or unit; and (iii) provide selective access to the inner area and/or the unit via the securement system, based upon the user data received by the transponder input mechanism.

2. The dynamic control containment unit of claim 1, wherein the transponder input mechanism is a badge worn by the user.

3. The dynamic control containment unit of claim 1, wherein the housing is in the form of a cabinet having the plurality of receptacles therein, wherein the securement system provides selective access to each of the plurality of receptacles.

4. The dynamic control containment unit of claim 1, wherein the housing is in the form of a mobile cart having the plurality of receptacles therein.

5. The dynamic control containment unit of claim 1, wherein the at least one antenna mechanism comprises a plurality of antenna mechanisms positioned on or integrated with a respective surface within the housing.

6. The dynamic control containment unit of claim 1, wherein the at least one antenna mechanism comprises at least two antenna mechanisms positioned on or integrated with a respective surface and dedicated to receiving signals emanating from an assigned inner area.

7. The dynamic control containment unit of claim 1, further comprising:
    a multiplexor mechanism in communication with the at least one antenna mechanism and configured to provide an output signal corresponding to the signal received by the at least one antenna mechanism;
    a signal reader mechanism in communication with the multiplexor mechanism and configured to provide an output signal corresponding to the signal received by the multiplexor mechanism; and
    an input/output mechanism in communication with the multiplexor mechanism and the signal reader mechanism and configured to translate at least one output signal into at least one digital output signal,
    wherein the central control device is in communication with the input/output mechanism and is configured to receive, process, and transmit signals and initiate an action based upon the at least one digital output signal received from the input/output mechanism.

8. The dynamic control containment unit of claim 1, wherein the signal emitted from the at least one transponder includes a characteristic unique to a group, set, or other association of multiple items.

9. The dynamic control containment unit of claim 1, further comprising a display mechanism in communication with the central control device and configured to include content representing at least one of the following: one or more actions initiated by the central control device, a use history, an item history, a user history, user data, item data, inventory data, shelf data, control containment unit data, a shelf inventory, a control containment unit inventory, an updated inventory, or any combination thereof.

10. The dynamic control containment unit of claim 1, wherein the input mechanism comprises a recognition signal configured to receive initial input signals corresponding to the plurality of items.

11. The dynamic control containment unit of claim 1, further comprising a door that is connected to a portion of the housing, such that the door can be opened and closed with respect to the housing.

12. A dynamic control containment unit for holding a plurality of discrete items, comprising:
 at least one radio frequency identification transponder associated with each item of the plurality of discrete items and configured to emit a radio frequency signal including a characteristic unique to a specific item of the plurality of discrete items;
 an enclosed housing having a plurality of receptacles accessible by a user, at least one of the plurality of items contained therein;
 at least one antenna in communication with at least one receptacle of the plurality of receptacles and configured to receive the radio frequency signals emitted from the at least one transponder, including the characteristic unique to a specific item;
 a controller in communication with the at least one antenna and configured to initiate an action based upon the signal content;
 at least one receptacle shielding element associated with each of the plurality of receptacles to prevent signals associated with items positioned in one of the plurality of receptacles from being read by the at least one antenna when the at least one antenna is receiving signals emanating from another of the plurality of receptacles;
 a housing shielding element associated with the housin to prevent signals from passing through the housing; and
 a securement system configured to prevent unauthorized access to the dynamic control containment unit, the securement system comprising:
  (a) an automated lock mechanism for preventing unauthorized access to the enclosed housing; and
  (b) a radio frequency identification transponder input mechanism configured to communicate with the at least one antenna such that the transponder input mechanism receives and transmits user data from a user of the unit to the controller, the user data comprising access level data or authorization level data associated with a specified user,
 wherein the controller is configured to associate the user that has accessed the enclosed housing with each item that is added or removed from the enclosed housing, and provide selective access to the enclosed housing via the securement system, based upon the user data received by the radio frequency identification transponder input mechanism.

13. The dynamic control containment unit of claim 12, wherein the plurality of receptacles comprise a plurality of drawers slidable with respect to the housing, such that the receptacles may be slid open, thereby providing access to the at least one item contained in the receptacles.

14. The dynamic control containment unit of claim 12, wherein the at least one antenna is positioned immediately adjacent the at least one receptacle and dedicated to receiving signals emanating from an assigned receptacle.

15. The dynamic control containment unit of claim 12, wherein the controller comprises:
 a multiplexor mechanism in communication with the at least one antenna and configured to provide an output signal corresponding to the signal received by the at least one antenna;
 a signal reader mechanism in communication with the multiplexor mechanism and configured to provide an output signal corresponding to the signal received by the multiplexor mechanism;
 an input/output mechanism in communication with at least one of the multiplexor mechanism and the signal reader mechanism and configured to translate at least one output signal into at least one digital output signal; and
 a central control device in communication with the input/output mechanism and configured to receive, process and transmit signals and initiate an action based upon the at least one digital output signal received from the input/output mechanism.

16. The dynamic control containment unit of claim 15, wherein the controller includes a power control module in communication with the input/output mechanism and configured to provide specified power outputs at specified power levels.

17. The dynamic control containment unit of claim 12, further comprising a switch mechanism in operable communication with the at least one receptacle of the plurality of receptacles, such that, when the at least one receptacle is moved away from the switch mechanism, a signal is transmitted to the controller, which instructs the at least one antenna to begin reading a signal emanating from the at least one transponder.

18. The dynamic control containment unit of claim 12, further comprising a display mechanism in communication with the controller and configured to provide a visual display to a user corresponding to one of an action initiated by the controller, a use history, an item history, a user history, user data, item data, inventory data, receptacle data, control containment unit data, a receptacle inventory, and a control containment unit inventory.

19. A method of determining an inventory of a dynamic control containment unit holding a plurality of discrete items, comprising:
 (a) providing the dynamic control containment unit comprising:
  at least one radio frequency identification transponder associated with each item of the plurality of discrete items and configured to emit a radio frequency signal including a characteristic unique to a specific item of the plurality of discrete items;
  an enclosed housing having a plurality of receptacles accessible by a user, at least one of the plurality of items contained therein;
  at least one antenna in communication with at least one receptacle of the plurality of receptacles and configured to receive the radio frequency signals emitted from the at least one transponder, including the characteristic unique to a specific item;
  a controller in communication with the at least one antenna and configured to initiate an action based upon the signal content; and
  a securement system configured to prevent unauthorized access to the dynamic control containment unit;
 (b) shielding each of the plurality of receptacles at least partially with at least one receptacle shielding element to prevent signals associated with items positioned in one of the plurality of receptacles from being read by the at least one antenna when the at least one antenna is receiving signals emanating from another of the plurality of receptacles;

(c) shielding the housing with a housing shielding element to prevent signals emanating from the plurality of receptacles from passing through the housing;

(d) transmitting, via a radio frequency identification transponder input mechanism configured to communicate with the at least one antenna, to the controller a user's authorization to access the dynamic control containment unit, or any combination thereof;

(e) receiving signals at the controller in response to the at least one receptacle being accessed;

(f) associating the signals with at least one of the plurality of discrete items;

(g) logging the identification of items into an inventory database, thereby providing an inventory of the items; and (h) upon subsequent access, repeat steps (e) - (g), thereby providing an updated inventory of the items.

* * * * *

UNITED STATES PATENT AND TRADEMARK OFFICE
CERTIFICATE OF CORRECTION

| | | |
|---|---|---|
| PATENT NO. | : 8,547,203 B2 | Page 1 of 1 |
| APPLICATION NO. | : 13/158827 | |
| DATED | : October 1, 2013 | |
| INVENTOR(S) | : Timur P. Sriharto et al. | |

It is certified that error appears in the above-identified patent and that said Letters Patent is hereby corrected as shown below:

In the Claims

Column 11, Line 38, Claim 12, delete "housin" and insert -- housing --

Signed and Sealed this
Eighteenth Day of February, 2014

Michelle K. Lee
*Deputy Director of the United States Patent and Trademark Office*